US007543179B2

(12) United States Patent  (10) Patent No.: US 7,543,179 B2
Zimmer et al.  (45) Date of Patent: Jun. 2, 2009

(54) ERROR MANAGEMENT TOPOLOGIES

(75) Inventors: Vincent J. Zimmer, Federal Way, WA (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 422 days.

(21) Appl. No.: 11/385,305

(22) Filed: Mar. 21, 2006

(65) Prior Publication Data
US 2006/0212762 A1 Sep. 21, 2006

Related U.S. Application Data

(63) Continuation-in-part of application No. 11/085,421, filed on Mar. 21, 2005.

(51) Int. Cl.
*G06F 11/00* (2006.01)
(52) U.S. Cl. .......................................................... 714/8
(58) Field of Classification Search ...................... 714/8
See application file for complete search history.

(56) References Cited

U.S. PATENT DOCUMENTS

| 4,471,427 | A |   | 9/1984  | Harris          |         |
|-----------|---|---|---------|-----------------|---------|
| 5,524,212 | A |   | 6/1996  | Somani et al.   |         |
| 5,644,539 | A | * | 7/1997  | Yamagami et al. | 365/200 |
| 5,701,516 | A |   | 12/1997 | Cheng et al.    |         |
| 5,860,083 | A |   | 1/1999  | Sukegawa        |         |
| 5,933,852 | A |   | 8/1999  | Jeddeloh        |         |
| 6,016,530 | A |   | 1/2000  | Auclair et al.  |         |
| 6,052,798 | A |   | 4/2000  | Jeddeloh        |         |
| 6,345,368 | B1 |  | 2/2002  | Bergsten        |         |
| 6,360,306 | B1 |  | 3/2002  | Bergsten        |         |
| 6,446,175 | B1 |  | 9/2002  | West et al.     |         |

(Continued)

FOREIGN PATENT DOCUMENTS

WO  9750035 A1  12/1997

(Continued)

OTHER PUBLICATIONS

Office Action received for U.S. Appl. No. 11/059,768 mailed Feb. 19, 2008, 8 pages.

(Continued)

*Primary Examiner*—Scott T Baderman
*Assistant Examiner*—Paul F. Contino
(74) *Attorney, Agent, or Firm*—Grossman, Tucker, Perreault & Pfleger, PLLC

(57) ABSTRACT

A method may include partitioning a plurality of processor cores into a main partition comprising at least one processor core capable of executing an operating system and an embedded partition comprising at least one different processor core. The embedded partition may be capable of: receiving a write request to write data on a target storage device; communicating with a remote system coupled to the embedded partition and remapping data corresponding to said write request to the remote system; detecting an error when attempting to write data to the storage device, leaving uncommitted data directed to the target storage device; and communicating with said remote system to retrieve the uncommitted data and writing the uncommitted data to the target storage device. The embedded partition of this embodiment may also be capable of performing these operations, at least in part, independently of said operating system being executed on said main partition.

16 Claims, 12 Drawing Sheets

U.S. PATENT DOCUMENTS

| | | | |
|---|---|---|---|
| 6,467,048 B1 * | 10/2002 | Olarig et al. | 714/7 |
| 6,629,192 B1 | 9/2003 | Schaefer et al. | |
| 6,782,453 B2 | 8/2004 | Keltcher et al. | |
| 6,907,505 B2 | 6/2005 | Cochran et al. | |
| 6,925,533 B2 | 8/2005 | Lewis | |
| 6,973,517 B1 | 12/2005 | Golden et al. | |
| 7,020,034 B2 | 3/2006 | Chen | |
| 7,055,055 B1 | 5/2006 | Schneider et al. | |
| 7,228,379 B2 | 6/2007 | Bress et al. | |
| 7,275,179 B1 | 9/2007 | Coatney | |
| 7,412,619 B2 | 8/2008 | Zimmer et al. | |
| 2002/0083264 A1 | 6/2002 | Coulson | |
| 2003/0163758 A1 * | 8/2003 | Austen et al. | 714/8 |
| 2003/0177322 A1 | 9/2003 | Crockett et al. | |
| 2005/0033908 A1 | 2/2005 | Chong et al. | |
| 2005/0134250 A1 | 6/2005 | Kim et al. | |
| 2006/0010227 A1 | 1/2006 | Atluri | |
| 2006/0026338 A1 | 2/2006 | Ebara et al. | |
| 2006/0184717 A1 * | 8/2006 | Rothman et al. | 711/103 |
| 2006/0195667 A1 | 8/2006 | Nakano et al. | |
| 2006/0236166 A1 | 10/2006 | Zimmer et al. | |

FOREIGN PATENT DOCUMENTS

| | | |
|---|---|---|
| WO | 2006088636 A1 | 8/2006 |
| WO | 2007109476 A1 | 9/2007 |

OTHER PUBLICATIONS

Office Action received for U.S. Appl. No. 11/059,768 mailed Apr. 11, 2007; 6 pages.

Office Action received for U.S. Appl. No. 11/059,768 mailed Nov. 28, 2007; 6 pages.

Notice Of Allowance Received for U.S. Appl. No. 11/085,421 mailed Apr. 10, 2008, 6 pages.

International Preliminary Report on Patentability for PCT Patent Application No. PCT/US2006/003319 mailed Aug. 30, 2007, 7 pages.

International Search Report and Written Opinion for PCT Application No. PCT/US2006/003319 mailed Jul. 24, 2006; 11 pages.

Office Action received for U.S. Appl. No. 11/085,421 mailed Nov. 14, 2007; 12 pages.

International Search Report and Written Opinion for application No. PCT/US2007/063980, mailed Aug. 28, 2007, 10 pgs.

Non-Final Office Action for U.S. Appl. No. 11/085,421 dated Nov. 14, 2007. 7 pages.

IEEE Std 802.3, Mar. 8, 2002, Revision of IEEE, STD 802.3, 2000 Edition, 802.3: IEEE Standard for Information Technology—Telecommunications and information exchange between systems—Local and metropolitan area networks—Specific requirements, Part 3: Carrier Sense Multiple Access with Collision Detection (CSMA/DC) Access Method and Physical Layer Specifications, 11 pgs.

The ATM Forum Technical Committee, ATM-MPLS Network Interworking, Version 1.0, 23 pgs., Aug. 2001.

Intel XScale Core, Developer's Manual, 220 pgs., Dec. 2000.

"Search Report and Written Opinion" for PCT/US2006/003319, mailed Jul. 24, 2006, 11 pages.

Office Action received for EP Application No. 06719924.0 mailed on Jul. 30, 2008, p. 3.

Office Action received for U.S. Appl. No. 11/059,768 mailed on Sep. 17, 2008, p. 20.

PCI Express Base Specification Revision 1.0a, Apr. 15, 2003; 428 pages.

Office Action received for CN Application No. 200680005313.X mailed on Sep. 5, 2008. 10 Pages.

Office Action received for U.S. Appl. No. 11/059,768 mailed on Mar. 18, 2009; 18 pages.

* cited by examiner

ERROR MANAGEMENT TOPOLOGIES

CROSS-REFERENCE TO RELATED APPLICATIONS

This application is a continuation-in-part of U.S. patent application Ser. No. 11/085,421 filed Mar. 21, 2005.

FIELD

The present disclosure relates to error management topologies

BACKGROUND

One conventional computer system may include a host processor running one or more operating systems and applications and may be capable of read and write transactions to a target storage system. In the conventional computer system, a write transaction to the target storage device may encounter an error. The conventional system is not capable of resolving a write error based on system policy information. Further, the host system may include system memory, and the host system may encounter a critical error. The conventional system is incapable of resolving the critical error to retrieve the contents of system memory.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
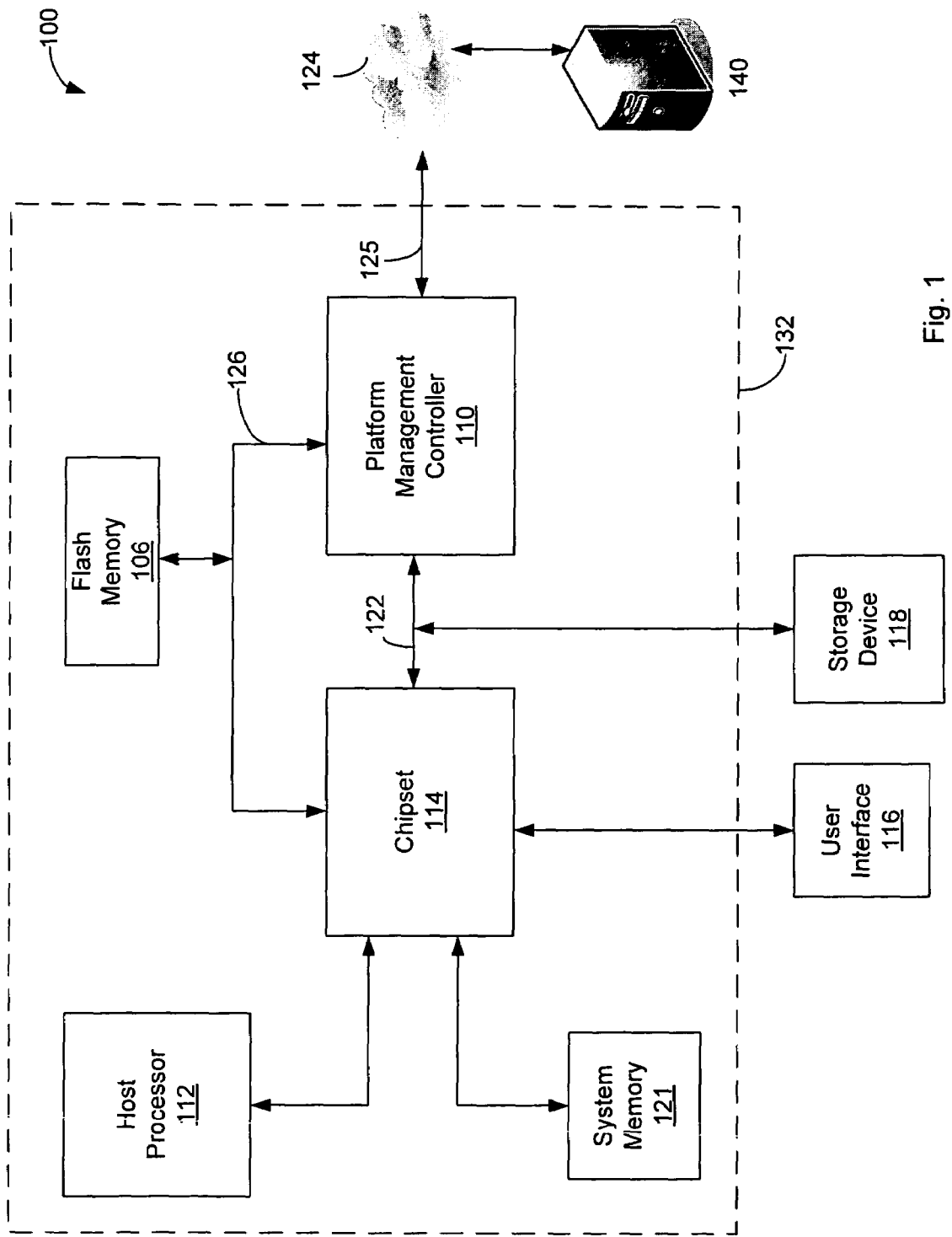
FIG. 1 is a diagram illustrating a system embodiment.

FIG. 1 illustrates a system embodiment 100 of the claimed subject matter. The system 100 may generally include a host processor 112, a first bus 122, a second bus 126, a user interface system 116, a chipset 114, system memory 121, platform management controller circuitry 110, and flash memory 106. This embodiment may also include a storage device 118. Storage device 118 may include, for example, a magnetic, optical and/or semiconductor media, for example, a hard disk device. The host processor 112 may include any variety of processors known in the art such as an Intel® Pentium® IV processor commercially available from the Assignee of the subject application. The buses 122, 126 may include various bus types to transfer data and commands. For instance, bus 122 may comply with the Peripheral Component Interconnect (PCI) Express™ Base Specification Revision 1.0, published Jul. 22, 2002, available from the PCI Special Interest Group, Portland, Oreg., U.S.A. (hereinafter referred to as a "PCI Express™ bus"). The bus 126 may include comply with a Serial Peripheral Interface (SPI) Specification (hereinafter referred to as an "SPI bus"). Processor 112, system memory 121, chipset 114, buses 122 and 126, flash memory 106 and platform management controller circuitry 110 may be comprised in a single circuit board, for example, motherboard 132, and these components collectively or individually may form a host system.

The user interface 116 may include a variety of devices for human users to input commands and/or data and to monitor the system such as a keyboard, pointing device, and video display. The chipset 114 may include host bridge/hub system (not shown) that couples the processor 112, system memory 121, user interface system 116, storage device 118, and platform management controller circuitry 110 to each other and to the bus 122. Chipset 114 may also be capable of coupling flash memory 106, host processor 112, system memory 121 and platform management controller circuitry 110 to each other and to bus 126. Chipset 114 may include integrated circuit chips, such as those selected from integrated circuit chipsets commercially available from the assignee of the subject application (e.g., graphics memory and I/O controller hub chipsets), although other integrated circuit chips may also, or alternatively be used.

System memory 121 may comprise one or more of the following types of memories: semiconductor firmware memory, programmable memory, non-volatile memory, read only memory, electrically programmable memory, random access memory, flash memory (which may include, for example, NAND or NOR type memory structures), magnetic disk memory, and/or optical disk memory. In this embodiment, memory 106 may comprise a flash memory. Either additionally or alternatively, memories 121 and/or 106 may comprise other and/or later-developed types of computer-readable memory. Machine-readable firmware program instructions may be stored in memories 121 and/or 106. As described below, these instructions may be accessed and executed by host processor 112 and/or platform management controller 110. When executed by host processor 112 and/or platform management controller 110, these instructions may result in host processor 112 and/or platform management controller 110 performing the operations described herein as being performed by host processor 112 and/or platform management controller 110.

Host processor 112 may be capable, among other things, of generating one or more input/output (I/O) transactions to read and/or write data to or from target storage device 118. The target storage device may include, for example, a local storage device (i.e., local device coupled to host system 100) and/or a remote storage device.

Alternatively or additionally, storage device 118 may comprise one or more redundant array of independent disks (RAID) and/or peripheral devices. Host processor 112 may generate these I/O transactions in response to, for example, boot operations of the host system, operating system (OS) operations and/or applications (e.g., software applications executing one or more instructions on host processor 112 and/or firmware instructions running on the host system). Alternatively or additionally, add-in devices, for example, add-in cards (not shown) coupled to host system 132 and/or remote applications (not shown) may be capable of generating one or more input/output (I/O) transactions to read and/or write data to or from storage device 118.

Platform management controller circuitry 110 may be capable of controlling read and/or write access to storage device 118, via bus 122. As used in any embodiment herein, "circuitry" may comprise, for example, singly or in any combination, hardwired circuitry, programmable circuitry, state machine circuitry, and/or firmware that stores instructions executed by programmable circuitry. Also, in any embodiment herein, circuitry 110 may be embodied as, and/or form part of, one or more integrated circuits. As used in any embodiment herein, an "integrated circuit" means a semiconductor device and/or microelectronic device, such as, for example, a semiconductor integrated circuit chip. As will be described in greater detail herein, circuitry 110 may also be capable of discovering a write error to storage device 118 and remapping a data write to a different area of storage device 118. In response to a read request, circuitry 110 may be capable of redirecting the data read request to the different area on the storage device where the data may be residing as a result of remapping operation performed by circuitry 110.

Platform management controller circuitry 110 may also be capable of communicating with one or more remote system 140 via network 124 and communications link 125. Remote system 140 may comprise, for example, a remote server system or remote workstation (which may be similar to host system 132) which may comprise one or more storage devices and/or a storage array (which may comprise, for example a storage array coupled to and controlled by one or more remote systems). In this embodiment, remote system 140 may be capable of storing, at least partially, data that is stored on storage device 118. As will be described in greater detail below, platform management circuitry 110 may be capable of controlling read and/or write access to one or more remote systems 140 based on, at least in part a read and/or write access to storage device 118. In this embodiment, for example, circuitry 110 may also be capable of discovering a write error to storage device 118 Circuitry 110 may also be capable of determining if the data associated with the write error is located on one or more remote systems 140, and if so, creating a map to the data on the remote system 140. In response to a read request, circuitry 110 may be capable of retrieving the data from the remote system 140.

Platform management controller circuitry 110 may be capable of controlling read and/or write access to system memory 121, via bus 122 and chipset 114. Circuitry 110 may also be capable of detecting at least one host system critical error and reading the contents of system memory 121. A "critical error", as used in any embodiment herein, may comprise a condition which may cause host processor 112, and/or an OS or application running on host processor, and/or boot instructions (which may be stored in flash memory 106) to stop performing as intended (and which may render the host system 132 inoperable). Circuitry 110 may also be capable of writing the contents of system memory 121 to storage device 118 and/or to one or more remote systems 140.

Platform management controller circuitry 110 may also be capable of generating out-of-band (OOB) read and/or write operations to 106 and/or storage device 118. OOB read and/or write operations may comprise, for example, one or more read and/or write operations that are performed independent of an OS being executed by the host processor in host system 132.

Figure 2:
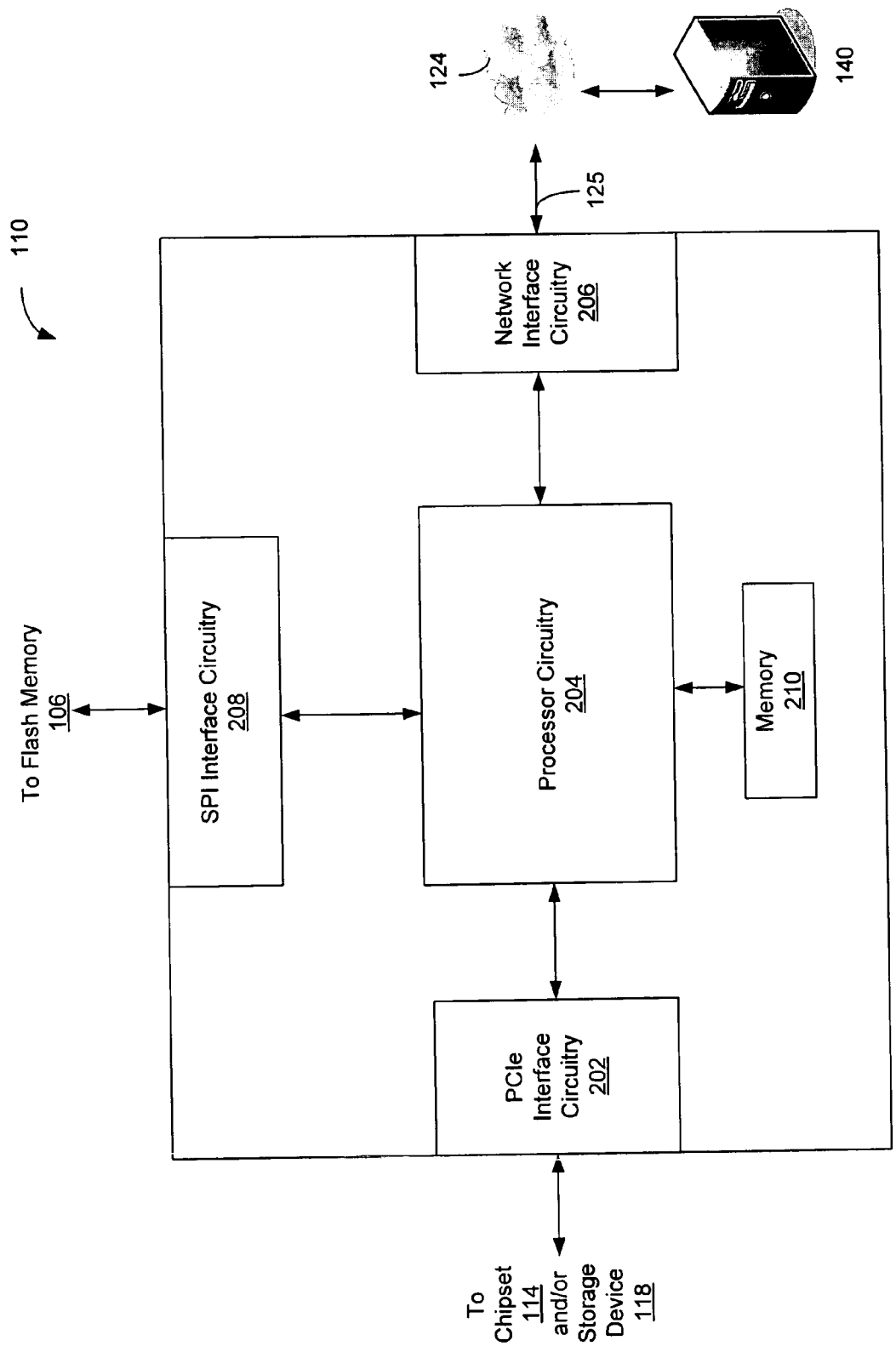
FIG. 2 is a diagram illustrating a platform management controller according to an embodiment.

FIG. 2 is a diagram illustrating in more detail platform management controller circuitry 110. In FIG. 2, certain portions of the system 100 depicted in FIG. 1 have been omitted for clarity (for example circuit board 132), but it is to be understood that like parts of FIG. 2 can be implemented in a manner consistent with an embodiment depicted in FIG. 1, or alternatively in other system implementations, without departing from this embodiment. Circuitry 110 may include processor circuitry 204 which may be capable of performing operations described herein as being attributed to platform circuitry 110. Processor circuitry 204 may comprise respective circuitry that may be compatible and/or in compliance with the Intel® XScale™ Core micro-architecture described in "Intel® XScale™ Core Developers Manual," published December 2000 by the Assignee of the subject application. Of course, processor circuitry 204 may comprise other types of processor core circuitry without departing from this embodiment. Circuitry 110 may also comprise memory 210. Memory 210 may comprise, for example, computer-readable program instruction memory that may contain respective sets of micro-code program instructions that processor circuitry 204 may execute. The execution of these respective sets of program instructions by processor circuitry 204 may result in the carrying out of operations described herein as being carried out by processor circuitry 204.

Memory 210 may comprise one or more platform policy instructions, which may define a rule or set of rules which may dictate for example, the management of storage device 118 and policy rules for read and/or write access to flash memory 106. Exemplary platform policy instructions may include the size of the reserved portion 204, enabling or disabling concealment of reserved portion 204, enabling and/or disabling read and/or write access to flash memory 106, priority rules associated with data write and/or read transactions to flash memory 106, and/or other platform policy instructions. Processor circuitry 204 may execute platform policy instructions during operation of platform management controller circuitry 110. Of course, these are only exemplary instructions and other platform policy instructions are equally contemplated herein.

In this embodiment, circuitry 110 may also include PCI Express (PCIe) interface circuitry 202 which may permit processor circuitry 204 to exchange commands and data with chipset 114 and/or storage device 118 via PCIe bus 122. Circuitry 110 may also include SPI interface circuitry 208 which may permit processor circuitry 204 to exchange commands and data with flash memory 106 via SPI bus 126. However, other bus technology and bus corresponding bus interface circuitry is equally contemplated by this embodiment. Circuitry 110 may further include network interface circuitry 206 which may permit processor circuitry 204 to exchange commands and data with one or more remote systems via network 124 and communications link 125.

Network 124 may comply or be compatible with an Ethernet communications protocol which may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in March 2002 and/or later versions of this standard. Alternative or additionally, network 124 may be capable of communicating using an X.25 communications protocol. The X.25 communications protocol may comply or be compatible with a standard promulgated by the International Telecommunication Union-Telecommunication Standardization Sector (ITU-T). Alternatively or additionally, network 124 may be capable of communicating using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, network 124 may be capable of communicating using an Asynchronous Transfer Mode (ATM) communications protocol. The ATM communications protocol may comply or be compatible with an ATM standard published by the ATM Forum titled "ATM-MPLS Network Interworking 1.0" published August 2001, and/or later versions of this standard. Of course, different and/or after-developed communication protocols are equally contemplated herein.

Figure 3:
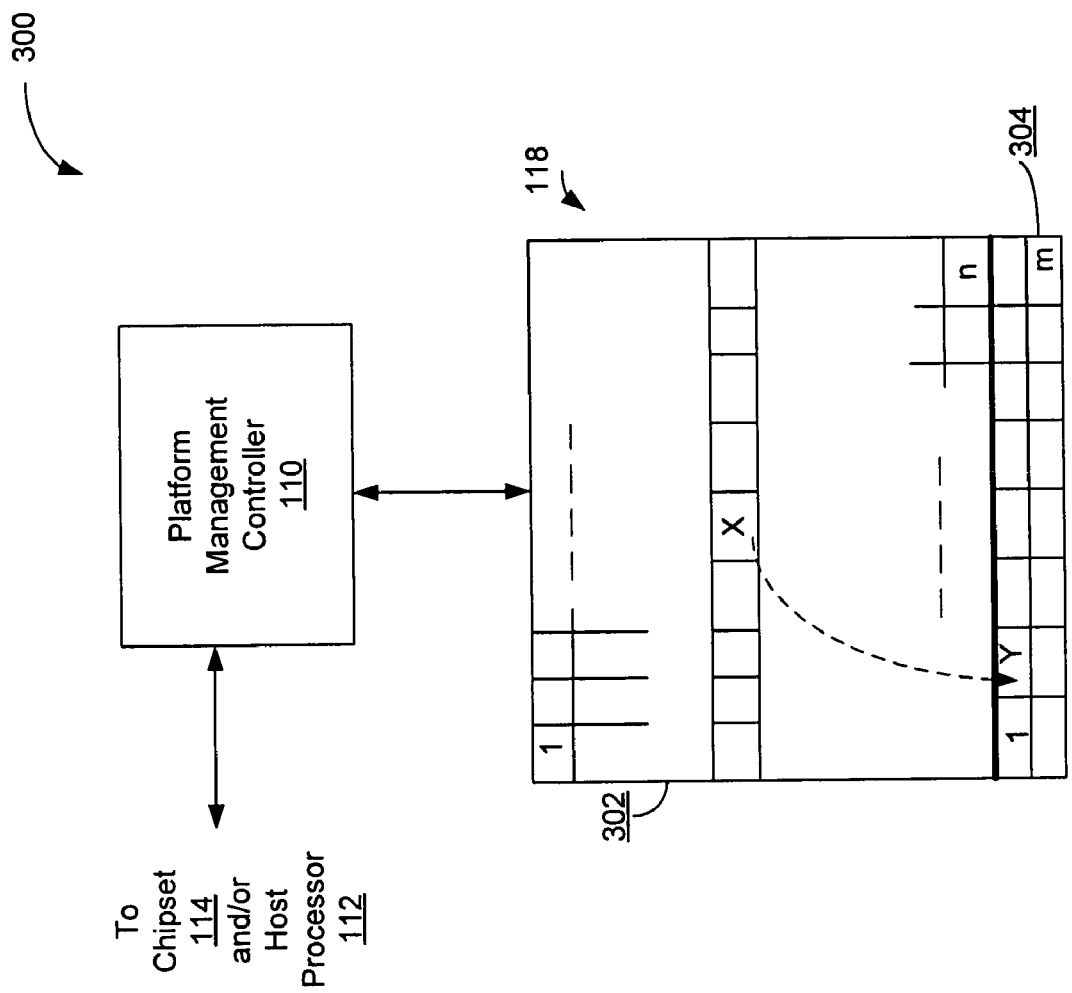
FIG. 3 is a diagram illustrating another system embodiment.

FIG. 3 is a diagram illustrating another system embodiment 300. In FIG. 3, certain portions of the system 100 depicted in FIG. 1 and platform management controller circuitry 110 depicted in FIG. 2 have been omitted for clarity (for example, circuit board 132, network 124 and remote system 140), but it is to be understood that like parts of FIG. 3 can be implemented in a manner consistent with an embodiment depicted in FIG. 1 and/or FIG. 2, or alternatively in other system implementations, without departing from this embodiment.

In this embodiment, storage device 118 may include a data area 302 and a reserved area 304. The data area 302 may comprise a plurality of sectors 1 . . . n which may be accessed by host processor 112, circuitry 110 and/or chipset 114 to read and/or write data thereon. In this embodiment, platform management controller circuitry 110 may be capable of controlling storage device 118 to reserve the reserved area 304. "Reserved area", as used herein with reference to storage device 118 may include a portion of storage device 118 that may be generally accessible to controller circuitry 110, and may be inaccessible from an OS being executed by host system 132. Depending on the media type of storage device 118, the size of reserved area 304 may be defined by, for example, a selected LBA address range and/or selected number of sectors (e.g., sectors 1 . . . m). Platform management controller circuitry 110 may also be capable of concealing reserved area 304 from being accessed by other circuitry, for example, concealing reserved portion 304 from host processor 112 and/or an OS or application being executed on host system 132 and/or chipset 114 and/or one or more remote systems (not shown) to prevent host processor 112 and/or an OS or application being executed on host system 132 and/or chipset 114 and/or one or more remote systems from accessing the reserved area 304 of the storage device 118. In this embodiment, circuitry 110 may be capable of receiving a request to write data on the data area 302 of the storage device 118. The write request may be generated by, for example, host processor a 112 and/or chipset 114. If an error is encountered during a data write attempt, storage device 118 may be capable of signaling that an error has occurred. In response to a signal from storage device 118 that a write error has occurred, circuitry 110 may also be capable of detecting a write error in storage device 118 which may arise during a data write operation. The error may include, for example, a failed data write attempt to one or more sectors of storage device 118, noted in FIG. 3 as an "X".

In response to the write error, circuitry 110 may be capable of remapping the data to the reserved area 304 of storage device 118. "Remapping" or "remap", as used herein, may be defined as changing the physical location of the data from one sector to another sector. "Remapping" may also include updating and/or changing an allocation table which may define where the data resides in storage device 118. Thus, for example as depicted in FIG. 3, sector "X" may be a faulty sector, and circuitry 110 may be capable of remapping data write attempts to sector "Y" of the reserved area 304. Circuitry 110 may also be capable of creating a map relating the location of the "Y" data on reserved area 304 to the "X" sector on the data area 302. Circuitry 110 may also be capable of receiving a read request, and checking the read request against the map, and if the read request is for data that may have been located on sector "X" in the data area 302, circuitry 110 may be capable of redirected the read request to the remapped data on sector "Y" of the reserved area 304.

Platform management controller circuitry 110 may also be capable of arbitrating read and/or write access of storage device 118 to protect reserved area 304 from being accessed. Thus, for example, if host processor 112 generates an I/O transaction to read or write data to storage device 118, platform management controller circuitry 110 may receive this request (via bus 120), and deny the read and/or write request if the data is stored on (or is to be written to) the reserved area 304 of storage device 118 and/or grant the read and/or write request if the data is stored on (or is to be written to) the data area 302 of storage device 118.

Figure 4:
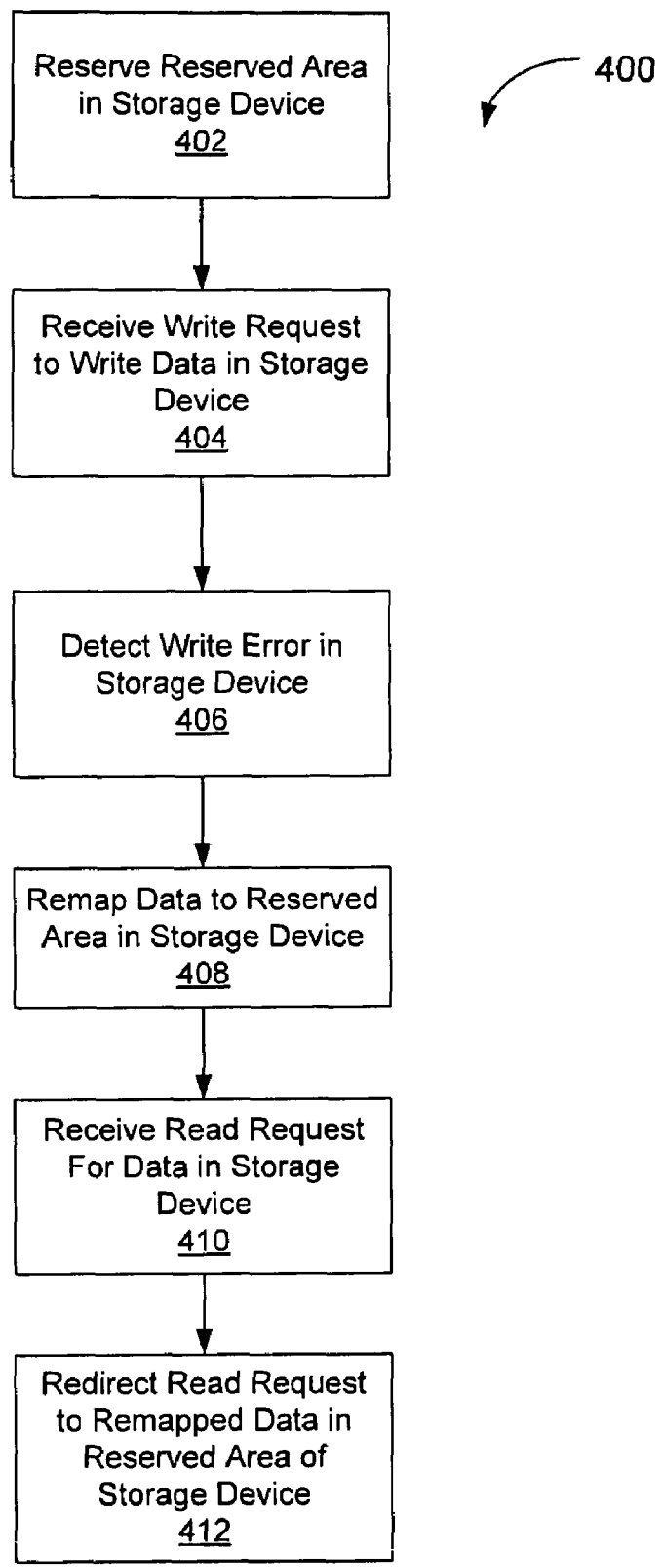
FIG. 4 is a diagram illustrating exemplary operations according to one embodiment.

FIG. 4 is a flowchart 400 illustrating exemplary operations that may be performed according to an embodiment. Operations may include reserving a reserved area in a storage device 402. Operations may also include receiving a write request to write data in the storage device 404. Operations may also include detecting a write error in the storage device 406. Operations may further include remapping the data to the reserved area in the storage device 408. Operations may also include receiving a read request for data in the storage device 410. If the data associated with the read request has been remapped to the reserved area of the storage device, operations may further include redirecting the read request to the remapped data in the reserved area of the storage device 412.

Figure 5:
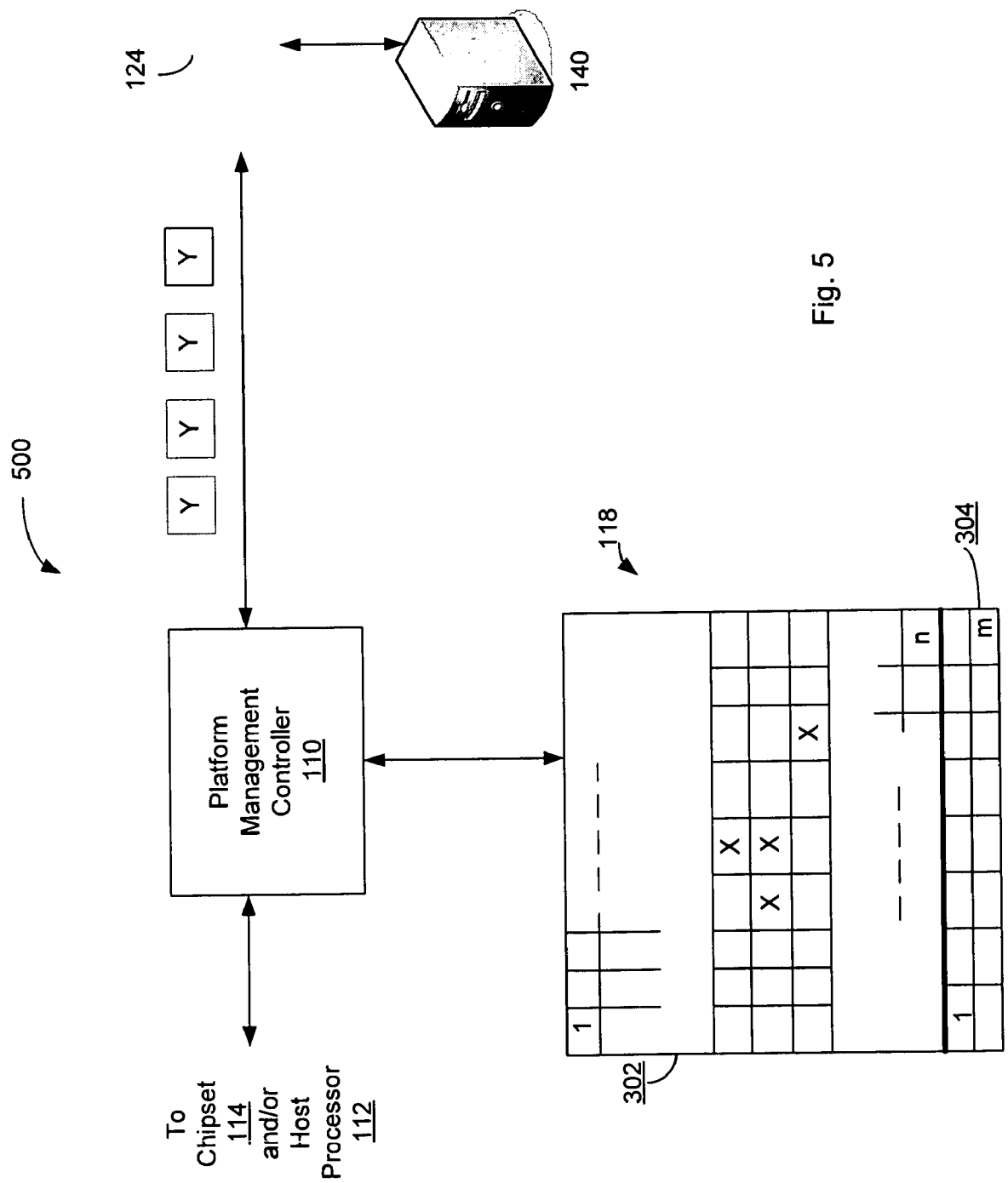
FIG. 5 is a diagram illustrating another system embodiment.

FIG. 5 is a diagram illustrating another system embodiment 500. In FIG. 5, certain portions of the system 100 depicted in FIG. 1 and platform management controller circuitry 110 depicted in FIG. 2 have been omitted for clarity (for example, circuit board 132), but it is to be understood that like parts of FIG. 5 can be implemented in a manner consistent with an embodiment depicted in FIG. 1 and/or FIG. 2, or alternatively in other system implementations, without departing from this embodiment.

In this embodiment, storage device 118 may include a data area 302. The data area 302 may comprise a plurality of sectors 1 . . . n which may be accessed by host processor 112, chipset 114, remote system 140 and/or circuitry 110 to read and/or write data thereon. Circuitry 110 may be capable of communicating with one or more remote systems 140, via network 142. As stated, one or more remote systems 140 may be capable of redundantly storing, in whole or in part, the data on storage device 118. In this embodiment, circuitry 110 may be capable of receiving a request to write data on the data area 302 of the storage device 118. The write request may be generated by, for example, host processor a 112 and/or chipset 114. In this embodiment, circuitry 110 may be capable of performing a data read and/or write request directed to storage device 118, in response to a data read and/or write request from for example, host processor a 112 and/or chipset 114 (which may include an OS read and/or write request). If an error is encountered during a data write attempt, storage device 118 may be capable of signaling that an error has occurred. In response to a signal from storage device 118 that a write error has occurred, circuitry 110 may also be capable of detecting a write error in storage device 118 which may arise during a data write operation. The error may include, for example, a data write attempt to one or more faulty sectors of storage device 118, noted in FIG. 5 as a plurality of "X"s.

In response to the write error, circuitry 110 may be capable of communicating with one or more remote systems 140 (via network 124) to determine if the data associated with the write request exists on one or more remote systems 140. This is depicted in FIG. 5, as the plurality of "Y"s representing data available on the remote system 140. If the data exists remotely, circuitry 110 may be capable of creating a map relating the location of the "Y" data on the remote system to the corresponding "X" sector on the data area 302 of storage device 118. Circuitry 110 may also be capable of receiving a read request, and checking the read request against the map, and if the read request is for data that may have been located on one or more "X" sectors in the data area 302, circuitry 110 may be capable of redirected the read request to the remapped data on the corresponding "Y" sectors of the remote system 140, and retrieving the data from the remote system 140.

If the remote system is unavailable or does not contain the "Y" data (corresponding to the data intended for the "X" sectors of storage device 118), circuitry 110 may, alternatively or additionally, remap the data to the reserved area 304 of storage device 118, in a manner described above with reference to the embodiment of FIG. 3. Circuitry 110 may also be capable of creating a map relating the location of the "Y" data on reserved area 304 to the "X" sector on the data area 302, and in a manner described above with reference to FIG. 3, remap read requests for that data to the reserved area 304. Alternatively or additionally, if the remote system 140 does not contain the "Y" data (corresponding to the data intended for the "X" sectors of storage device 118), circuitry 110 may be capable of remapping the data to the remote system 140, and thus storing the data remotely.

Figure 6:
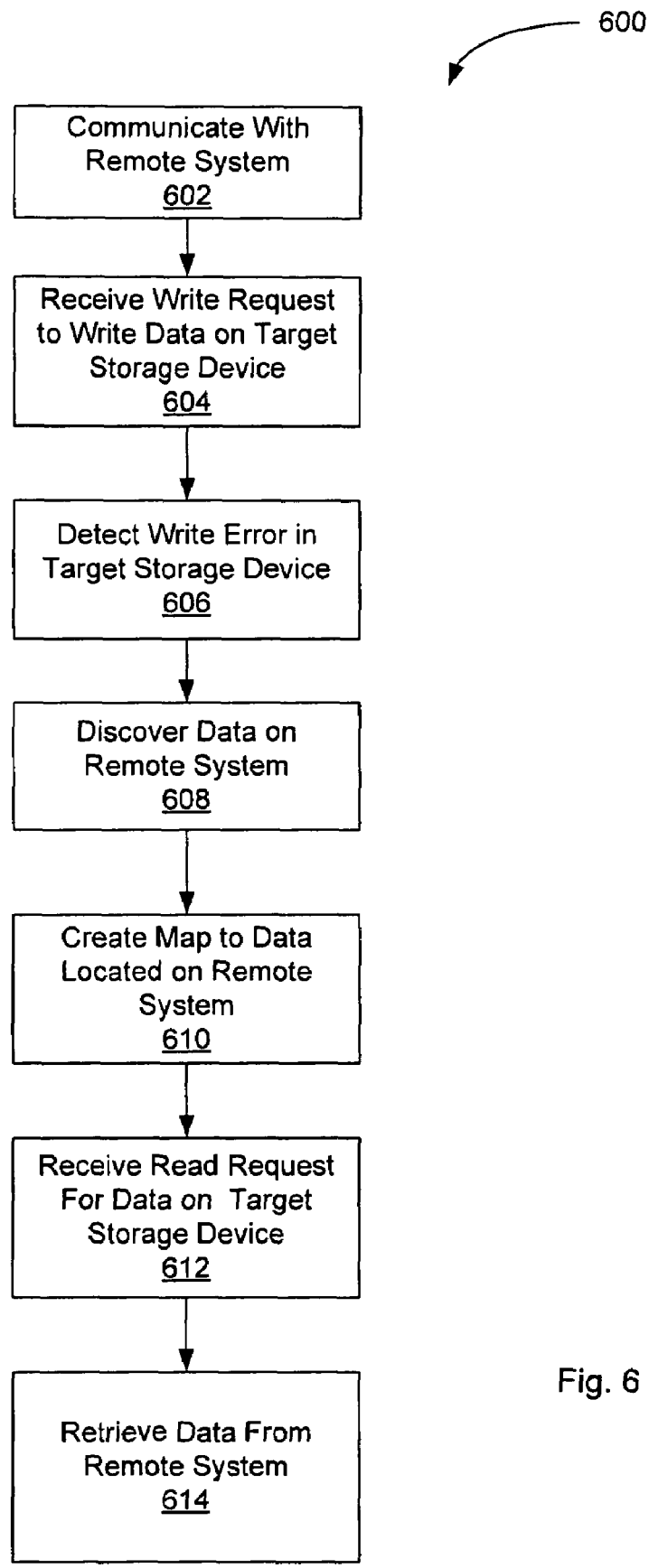
FIG. 6 is a diagram illustrating exemplary operations according to another embodiment.

FIG. 6 is a flowchart illustrating exemplary operations 600 that may be performed according to another embodiment. Operations may include communicating with a remote system 602. Operations may further include receiving a write request to write data to a target storage device 604. Operations may also include detecting a write error in the target storage device 606. Operations may also include discovering the data associated with the write request on the remote system 608. If the data is located remotely, operations may also include creating a map to the data on the remote system 610. Operations may also include receiving a read request for data on the target storage device 612. If the data associated with the read request has been remapped to the remote system, operations may further include retrieving the data from the remote system 612.

Figure 7:
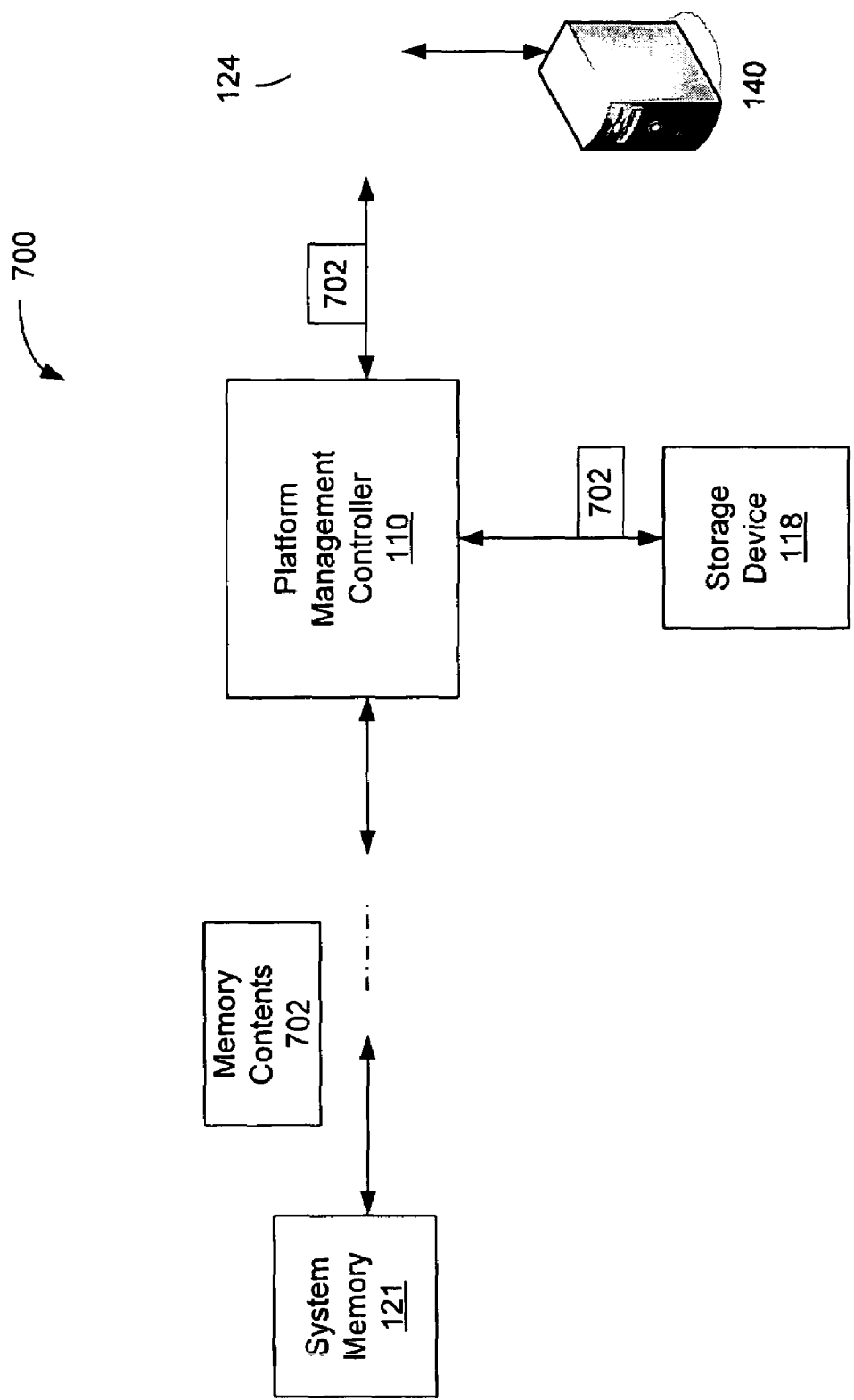
FIG. 7 is a diagram illustrating another system embodiment.

FIG. 7 is a diagram illustrating another system embodiment 700. In FIG. 7, certain portions of the system 100 depicted in FIG. 1 and platform management controller circuitry 110 depicted in FIG. 2 have been omitted for clarity (for example, circuit board 132), but it is to be understood that like parts of FIG. 7 can be implemented in a manner consistent with an embodiment depicted in FIG. 1 and/or FIG. 2, or alternatively in other system implementations, without departing from this embodiment.

In this embodiment, platform management controller circuitry 110 may be capable of reading the memory contents 702 of system memory 121. Circuitry 110 may also be capable of writing the memory contents 720 of system memory 121 to storage device 118 (and this operation may be performed in a manner similar to the embodiment described above with reference to FIG. 3). Alternatively or additionally, circuitry 110 may also be capable of writing the memory contents 720 of system memory 121 to one or more remote system 140, via network 124 (and this operation may be performed in a manner similar to the embodiment described above with reference to FIG. 5). For example, a critical error may occur which may prevent an OS and/or application being executed on a host system from accessing memory. If a critical error occurs, memory processor 112 and/or chipset 114 may be capable of signaling that an error has occurred. In response to a signal from processor 112 and/or chipset 114 that a critical error has occurred, circuitry 110 may be capable of detecting a critical error and storing the memory contents 121 to storage device 118 or remote system 140 (or both). This may enable, for example, an audit of the data in system memory 121 at the time of the critical error.

Figure 8:
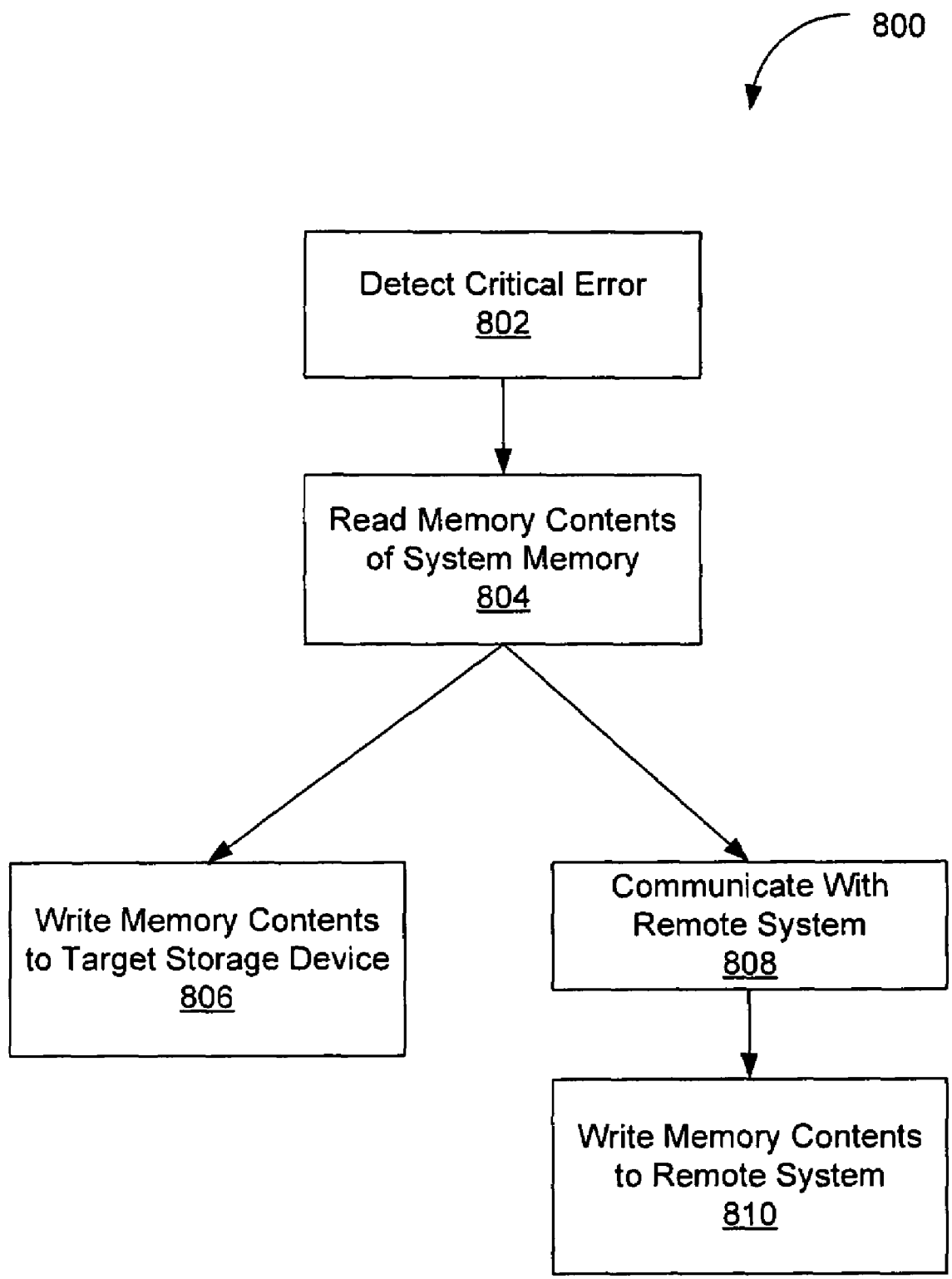
FIG. 8 is a diagram illustrating exemplary operations according to another embodiment.

FIG. 8 is a flowchart illustrating exemplary operations 800 that may be performed according to another embodiment. Operations may include detecting a critical error 802. Operations may further include reading the memory contents of system memory 804. Operations may also include writing the memory contents to a target storage device 806. Alternatively or additionally, operations may include communicating with a remote system 808, and writing the memory contents to the remote system 810.

Figure 9:
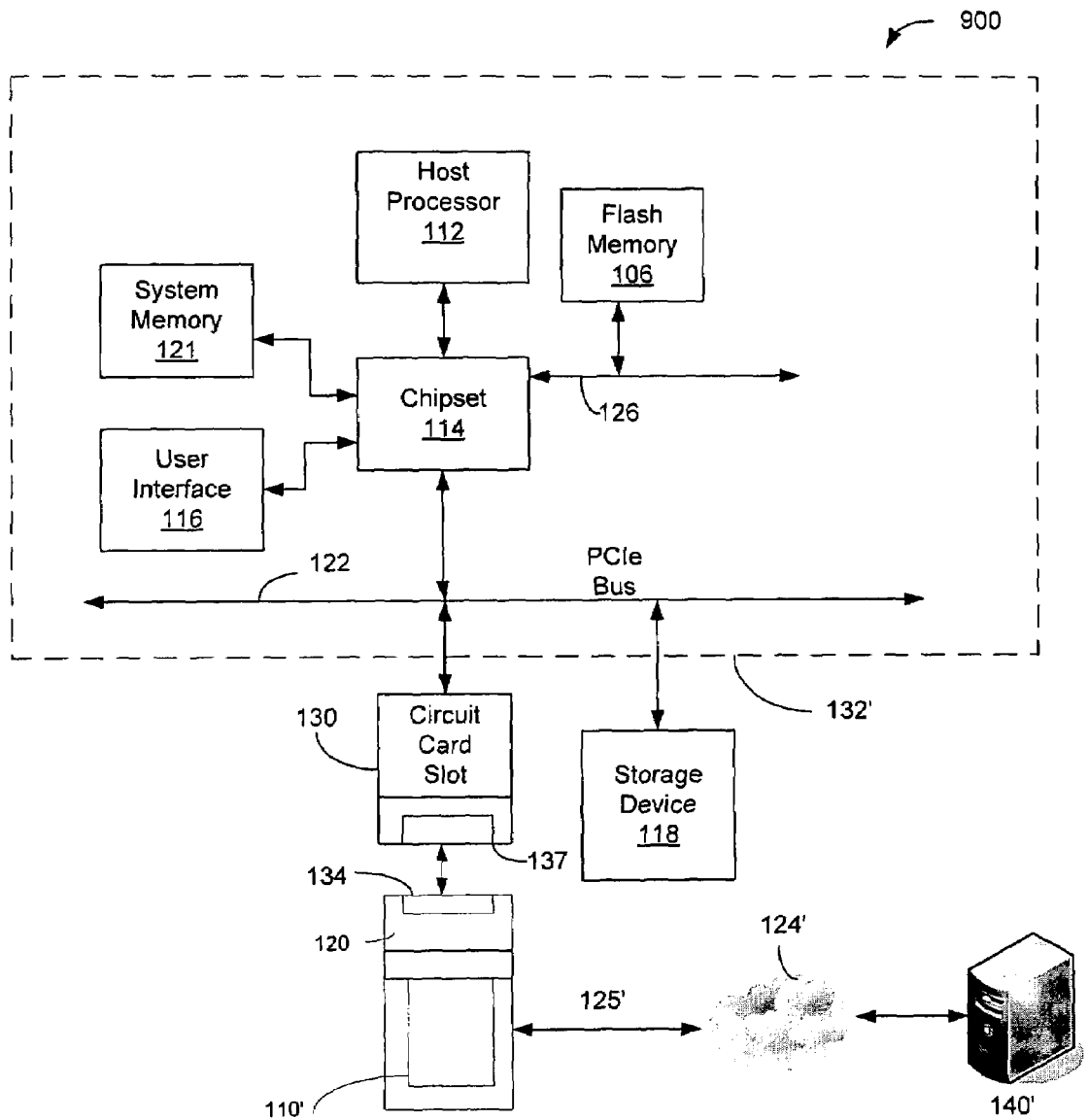
FIG. 9 is a diagram illustrating another system embodiment.

FIG. 9 illustrates another system embodiment 900 of the claimed subject matter. In this embodiment, platform management controller circuitry 110' may be comprised in a circuit card 120 which may be coupled to bus 122. As with the embodiment of FIG. 1, platform management controller circuitry 110' may be comprised in, or form part of, one or more integrated circuit chips. This embodiment may include a circuit card slot 130. The circuit card 120 may be constructed to permit it to be inserted into slot 130. When the circuit card 120 is properly inserted into slot 130, connectors 134 and 137 may become electrically and mechanically coupled to each other. When connectors 134 and 137 are so coupled to each other, the card 120 may become electrically coupled to bus 122 and may exchange data and/or commands with system memory 121, host processor 112, user interface system 116 and/or flash memory 106 via bus 122 and/or bus 126 and chipset 114. Alternatively or additionally, platform management controller circuitry 110' may exchange commands and data with host system 132' and one or more remote systems coupled to network 124', via communications link 125'. The operation of platform management circuitry 110 in this embodiment may be identical to the operation described above with reference to FIGS. 1-8, except that SPI bus interface circuitry 308 may be omitted and instead commands and data may be exchanged between circuit card 120 and flash memory 106 via chipset 114.

Figure 10:
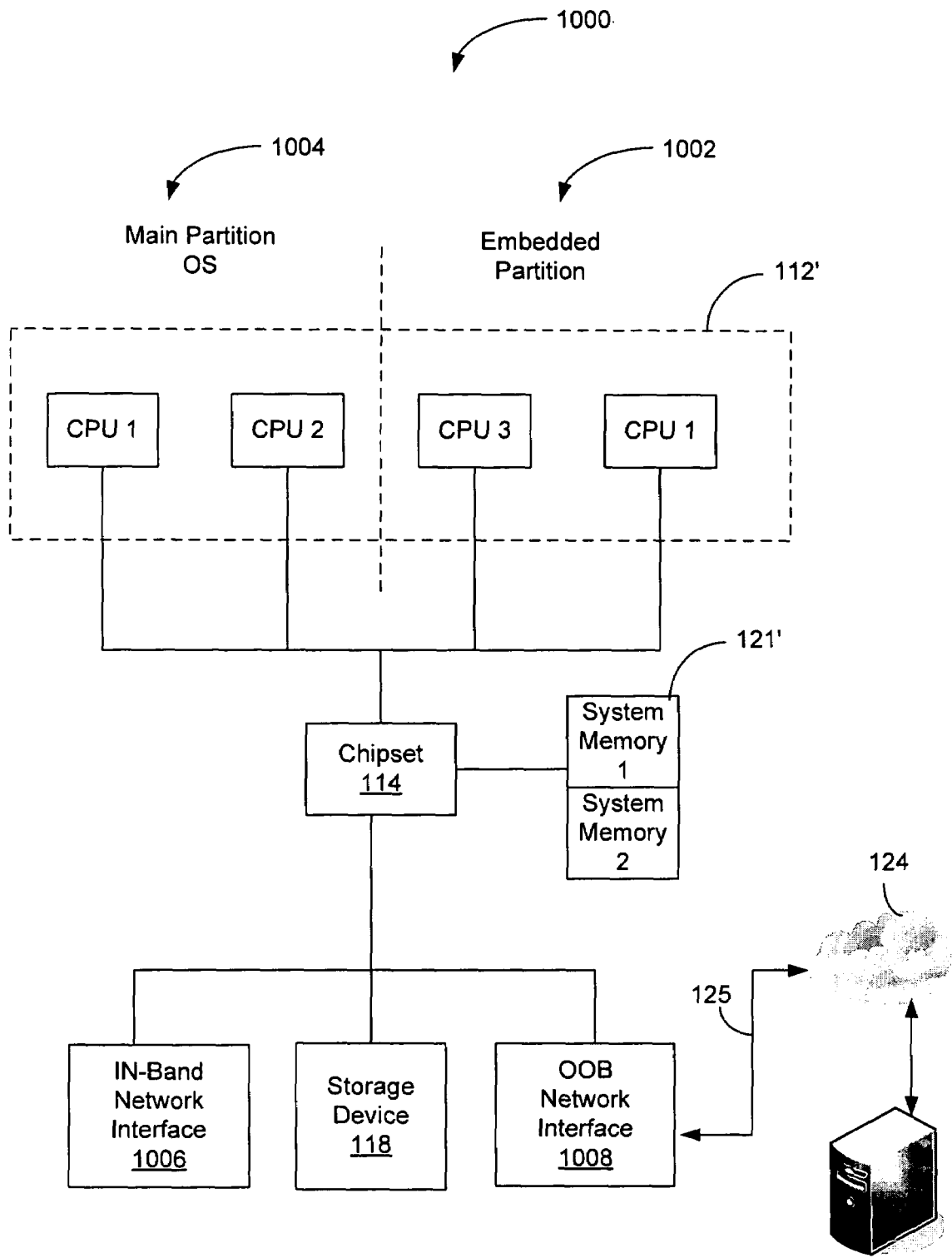
FIG. 10 illustrates another system embodiment of the claimed subject matter.

FIG. 10 illustrates another system embodiment 1000 of the claimed subject matter. The system 1000 may generally include a multiple core (multi-core) host processor 112', a chipset 114, system memory 121', in-band network interface circuitry 1006, storage device 118, and out-of-band (OOB) network interface circuitry 1008 capable of communicating with one or more remote systems 140 over network 124, via communications link 125. The multi-core host processor 112' may include any variety of processors known in the art having a plurality of cores, for example, an Intel® Pentium® D dual core processor commercially available from the Assignee of the subject application.

In this embodiment, the multi-core processor 112' may include a plurality of core CPUs, for example, CPU1, CPU2, CPU3 and CPU4. Of course, additional or fewer cores may be used in this embodiment. The multi-core processor 112' may be logically and/or physically divided into a plurality of partitions. For example, in this embodiment, processor 112' may be divided into a main partition 1004 that includes CPU1 and CPU2, and an embedded partition 1002 that includes CPU3 and CPU4. The main partition 1004 may be capable of executing an operating system (e.g., Windows, Linux, etc.). The embedded partition 1002 may be capable of executing I/O transactions with the storage device 118 and/or the OOB network interface 1008, as will be described in greater detail below.

In this embodiment, memory 121' may be logically and/or physically partitioned into system memory 1 capable of storing commands, instructions, and/or data for operation of the main partition 1004, and system memory 2 capable of storing commands, instructions, and/or data for operation of the embedded partition 1002. OOB network interface 1008 and/or in-band network interface 1006 may comprise a network interface circuitry on a card capable of being coupled to a bus (similar to card 120 of FIG. 9). In this embodiment, OOB network interface 1008 may be capable of communicating with remote system 140 in response to OOB commands from the embedded partition 1002 to read and/or write data from/to the remote system 140. In-band network interface 1006 may be capable of communicating with a remote system (not shown) in response to commands from the main partition 1004.

The operational features of this embodiment may be similar to those described above with reference to FIGS. 1-9. However, in this embodiment, the embedded partition 1002 may be capable of performing the operations attributed to the platform management controller 110 (described in detail above). While the main partition 1004 may be capable of executing an OS as well as I/O transactions with the target storage device 118, the embedded partition 1002 may be capable of operating out-of-band with respect to the main partition, meaning that the embedded partition may be capable of operating independently of the OS being executed on the main partition 1004. In that regard, the embedded partition 1002 may operate as a target device proxy agent to handle I/O transactions with the target device 118 for the main partition 1004 and independently of the OS being executed on the main partition.

In this embodiment, the embedded partition 1002 may be capable of receiving write commands to write data to the target storage device 118. Write commands may be generated by, for example, the main partition 1004. In response to a pending write request directed to the target device 118, the embedded partition 1002 may split the write request to write the data to the storage device 118 and/or the remote system 140. If there is a pending write request and an error occurs (for example, a write error, critical system error causing the main partition to crash and reset, a watchdog timeout error, etc.), there may be uncommitted data (and/or partially committed data) that does not get written to the target device 118. In this instance, embedded partition 1002 may be capable of detecting the error in progress, such that completing a pending write request to the target device 118 does not occur, and writing the uncommitted data corresponding to the pending write request to the remote system 140. Upon reset of the main partition 1004, the embedded partition 1002 may be capable of sending a request to the remote system 140 (via the OOB network interface 1008) to retrieve the uncommitted data and write the uncommitted data to the target device 118.

To that end, and upon initialization after the processor 112' resets, the embedded partition 1002 may create a "mailbox" in system memory 2. The mailbox may comprise, for example, a memory allocation for one or more specified devices in the system 1000. Thus, for example, the embedded partition 1002 may create a mailbox for the OOB network interface 1008. The embedded partition 1002 may include in the mailbox for the OOB network interface 1008, for example, instructions that may be accessed by the OOB network interface 1008 to communicate with the remote system 140 to retrieve the uncommitted data. The mailbox may also include LBA (e.g., sectors, clusters, etc.) and/or pointer information associated with the location of the uncommitted data on the remote system 140.

Figure 11:
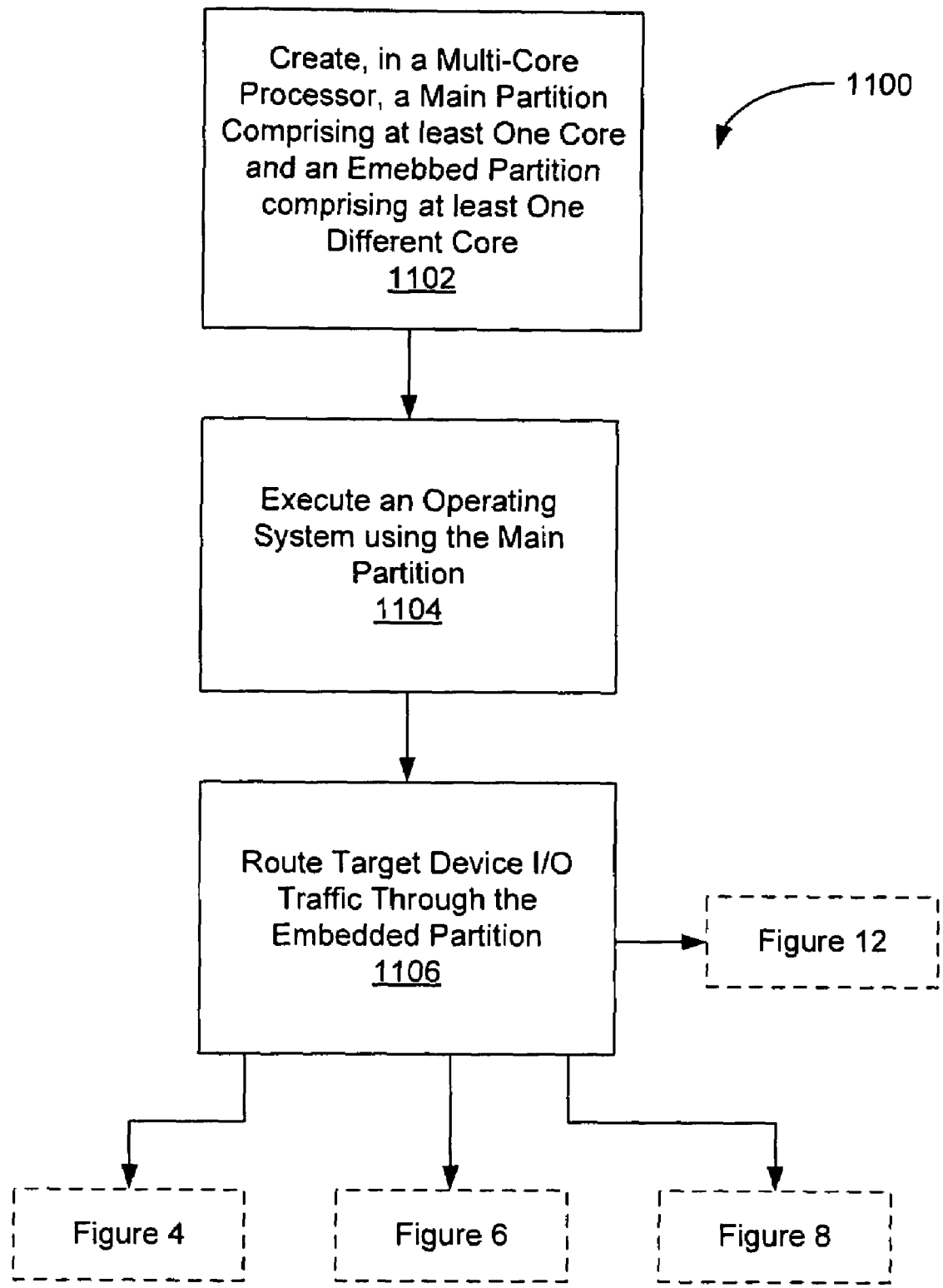
FIG. 11 is a diagram illustrating exemplary operations according to another embodiment.

FIG. 11 is a flowchart illustrating exemplary operations 1100 that may be performed according to another embodiment. Operations may include creating, in a multi-core processor, a main partition comprising at least one core and an embedded partition comprising at least one different core 1102. Operations may further include executing an operating system using the main partition 1104. Operations may additionally include routing target device I/O traffic through the embedded partition 1106. Operations may further include write and read error operations as described above with reference to FIG. 4, remote data recovery as described above with reference to FIG. 6, system error recovery operations described above with reference to FIG. 8, and/or operations as described below with reference to FIG. 12.

Figure 12:
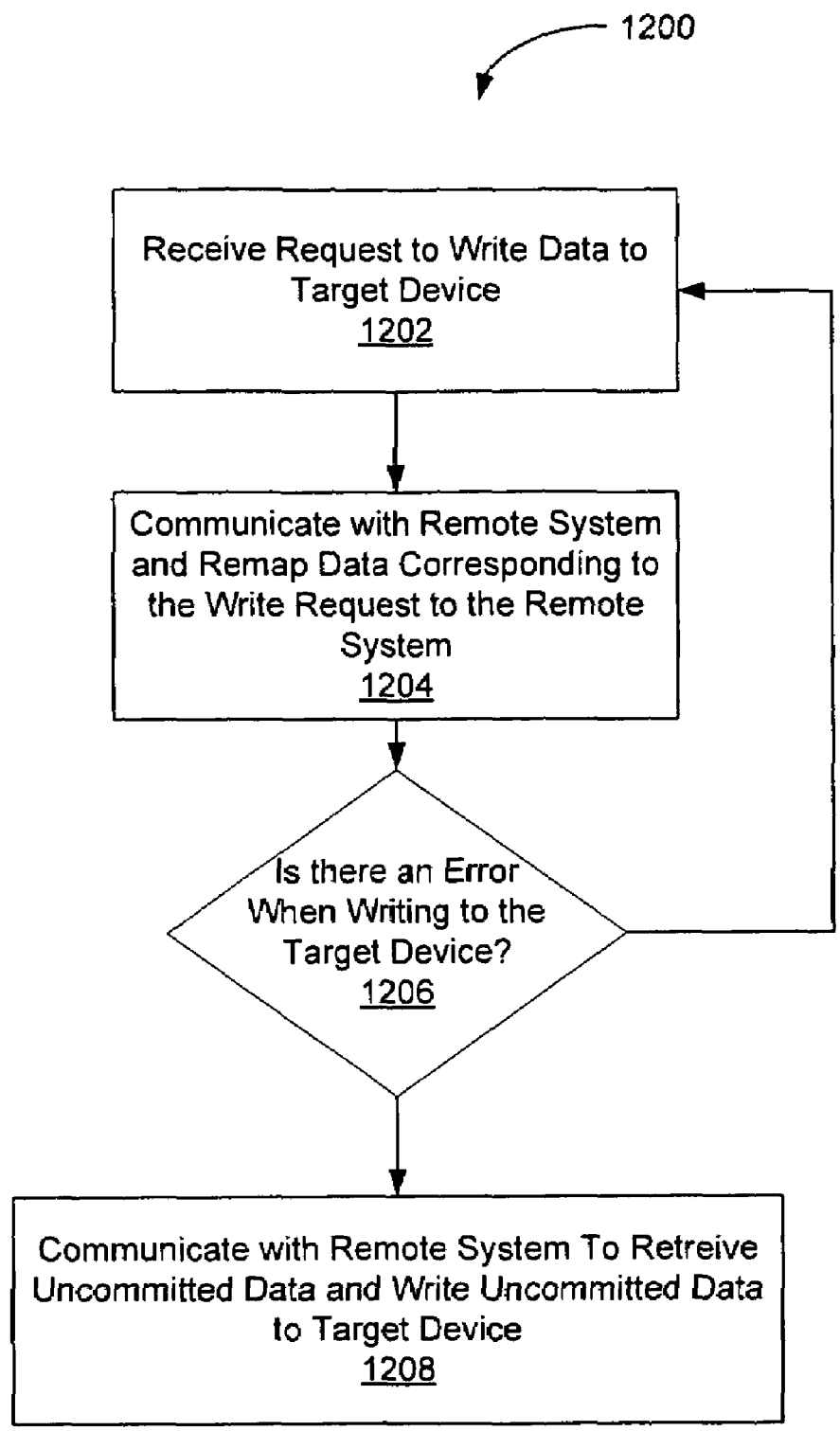
FIG. 12 is a diagram illustrating exemplary operations according to another embodiment.

FIG. 12 is a flowchart illustrating exemplary operations 1200 that may be performed according to another embodiment. Operations may include receiving a request to write data to a target device 1202. Operations may further include communicating with a remote system and remapping the data corresponding to the write request to the remote system 1204. Operations may also include detecting an error when writing to the target device, such that there may exists uncommitted data 1206. Operations may additionally include communicating with the remote system to retrieve the uncommitted data and write the uncommitted data to the target device 1208.

Thus, in summary, at least one embodiment herein may include an integrated circuit (IC) comprising a plurality of processor cores processor. The IC may include a main partition comprising at least one processor core capable of executing an operating system and an embedded partition comprising at least one different processor core. The embedded partition may be capable of the following operations: receiving a write request to write data on a target storage device, communicating with a remote system coupled to the embedded partition and remapping data corresponding to the write request to the remote system; detecting an error when attempting to write data to the storage device, leaving uncommitted data directed to the target storage device; and communicating with the remote system to retrieve the uncommitted data corresponding to said write request and writing the uncommitted data to the target storage device. The embedded partition may also be capable of performing these operations, at least in part, independently of the operating system being executed on the main partition.

Advantageously, the integrated circuit of this embodiment may permit storing of event logs and data on the reserved portion of the storage device which may be used for system audits. Further advantageously, the integrated circuit of this embodiment may be able to store data in a secure (concealed) reserved portion of the storage device which may be inaccessible to operating system read/write operations. Also, the integrated circuit of this embodiment may be capable of saving host system memory contents to the reserved portion of the storage device and/or to a remote system to permit, for example, audit and recovery of memory contents when a host system critical error occurs. The integrated circuit of this embodiment may also be capable of performing one or more operations independently of an operating system. In an alternative embodiment, a software platform driver may be employed that receives write and/or read errors associated with the target storage device and communicates such errors to the embedded partition. Such a driver may enable, for example, one or more error recovery strategies provided herein when the error occurs in software running on the main partition (i.e., before a read or write instruction is passed to the embedded partition).

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. An apparatus, comprising:
an integrated circuit (IC) comprising a plurality of processor cores, said IC having a main partition comprising at least one processor core capable of executing an operating system and an embedded partition comprising at least one different processor core, said embedded partition is capable of performing the following operations:
receiving a write request to write data on a target storage device,
communicating with a remote system coupled to the embedded partition and remapping data corresponding to said write request to the remote system;
detecting an error when attempting to write data to the storage device, leaving uncommitted data directed to the target storage device; and
communicating with said remote system to retrieve the uncommitted data corresponding to said write request and writing the uncommitted data to the target storage device, wherein said error comprises a critical error involving the main partition capable of causing the main partition to reset, said embedded partition is further capable of writing the uncommitted data to the remote system and, upon initialization from said reset, the embedded partition is further capable of retrieving, from the remote system, the uncommitted data and storing the uncommitted data on the target storage device.

2. The apparatus of claim 1, wherein:
said embedded partition is further capable of remapping data corresponding to the write request to a reserved area of the target storage device, said embedded partition is further capable of receiving at least one data read request to read said data corresponding to said error and redirecting said data read request to said reserved area of said target storage device.

3. The apparatus of claim 1, wherein:
said embedded partition is further capable of receiving at least one data read request for data on said target device and redirecting said read request to said remote system to retrieve said data.

4. The apparatus of claim 1, wherein:
said embedded partition is further capable of performing said operations, at least in part, independently of said operating system being executed on said main partition.

5. A system, comprising:
an integrated circuit (IC) comprising a plurality of processor cores, said IC having a main partition comprising at least one processor core capable of executing an operating system and an embedded partition comprising at least one different processor core, and an out-of-band (OOB) network interface card being capable of being coupled to a bus, said embedded partition is capable of:
receiving a write request to write data on a target storage device,
communicating, via said OOB network interface card, with a remote system coupled to the embedded partition and remapping data corresponding to said write request to the remote system;
detecting an error when attempting to write data to the storage device, leaving uncommitted data directed to the target storage device; and
communicating, via said OOB network interface card, with said remote system to retrieve the uncommitted data corresponding to said write request and writing the uncommitted data to the target storage device, wherein said error comprises a critical error involving the main partition capable of causing the main partition to reset, said embedded partition is further capable of writing the uncommitted data to the remote system and, upon initialization from said reset, the embedded partition is further capable of retrieving, from the remote system, the uncommitted data and storing the uncommitted data on the target storage device.

6. The system of claim 5, wherein:
said embedded partition is further capable of remapping data corresponding to the write request to a reserved area of the target storage device, said embedded partition is further capable of receiving at least one data read request to read said data corresponding to said error and redirecting said data read request to said reserved area of said target storage device.

7. The system of claim 5, wherein:
said embedded partition is further capable of receiving at least one data read request for data on said target device and redirecting said read request to said remote system to retrieve said data.

8. The system of claim 5, wherein:
said embedded partition is further capable of performing said operations, at least in part, independently of said operating system being executed on said main partition.

9. An article comprising:
a storage medium storing instructions that when executed by a machine result in the following operations:
partitioning a plurality of processor cores into a main partition comprising at least one processor core capable of executing an operating system and an embedded partition comprising at least one different processor core, said embedded partition is capable of performing the following operations:
receiving a write request to write data on a target storage device,
communicating with a remote system coupled to the embedded partition and remapping data corresponding to said write request to the remote system;
detecting an error when attempting to write data to the storage device, leaving uncommitted data directed to the target storage device;
communicating with said remote system to retrieve the uncommitted data corresponding to said write request and writing the uncommitted data to the target storage device; and writing, in response to a critical error involving the main partition capable of causing the main partition to reset, the uncommitted data to the remote system and, upon initialization from said reset, retrieving, from the remote system, the uncommitted data and storing the uncommitted data on the target storage device.

10. The article of claim 9, wherein said instructions that when executed by said machine result in the following additional operations:

remapping data corresponding to the write request to a reserved area of the target storage device; receiving at least one data read request to read said data corresponding to said error; and redirecting said data read request to said reserved area of said target storage device.

11. The article of claim 9, wherein said instructions that when executed by said machine result in the following additional operations:

receiving at least one data read request for data on said target device and redirecting said read request to said remote system to retrieve said data.

12. The article of claim 9, wherein:

said embedded partition is further capable of performing said operations, at least in part, independently of said operating system being executed on said main partition.

13. A method, comprising:

partitioning a plurality of processor cores into a main partition comprising at least one processor core capable of executing an operating system and an embedded partition comprising at least one different processor core, said embedded partition is capable of performing the following operations:

receiving a write request to write data on a target storage device, communicating with a remote system coupled to the embedded partition and remapping data corresponding to said write request to the remote system;

detecting an error when attempting to write data to the storage device, leaving uncommitted data directed to the target storage device; and communicating with said remote system to retrieve the uncommitted data corresponding to said write request and writing the uncommitted data to the target storage device and writing, in response to a critical error involving the main partition capable of causing the main partition to reset, the uncommitted data to the remote system and, upon initialization from said reset, retrieving, from the remote system, the uncommitted data and storing the uncommitted data on the target storage device.

14. The method of claim 13, further comprising:

remapping data corresponding to the write request to a reserved area of the target storage device; receiving at least one data read request to read said data corresponding to said error; and redirecting said data read request to said reserved area of said target storage device.

15. The method of claim 13, further comprising:

receiving at least one data read request for data on said target device and redirecting said read request to said remote system to retrieve said data.

16. The method of claim 13, wherein:

said embedded partition is further capable of performing said operations, at least in part, independently of said operating system being executed on said main partition.

* * * * *